United States Patent [19]

Kitayama et al.

[11] Patent Number: 5,453,989
[45] Date of Patent: Sep. 26, 1995

[54] SUBSCRIBER DIGITAL TRANSMISSION SYSTEM

[75] Inventors: Seiji Kitayama; Hiroyuki Matsumoto; Eiji Shimose, all of Kawasaki, Japan

[73] Assignee: Fujitsu Limited, Kawasaki, Japan

[21] Appl. No.: 302,242

[22] Filed: Sep. 8, 1994

Related U.S. Application Data

[63] Continuation of Ser. No. 32,868, Mar. 18, 1993, abandoned.

[30] Foreign Application Priority Data

Mar. 19, 1992 [JP] Japan .................................. 4-063824
Mar. 19, 1992 [JP] Japan .................................. 4-063825

[51] Int. Cl.[6] .................................................. H04J 3/12
[52] U.S. Cl. ............................ 370/110.1; 370/112
[58] Field of Search ............................ 370/13, 15, 14, 370/16, 16.1, 110.1, 112; 379/1, 5; 371/5, 20.4, 20.5, 19

[56] References Cited

U.S. PATENT DOCUMENTS

| | | | |
|---|---|---|---|
| 4,245,340 | 1/1981 | Landry | 370/111 |
| 4,551,830 | 11/1985 | Huffman | 370/15 |
| 4,759,009 | 7/1988 | Casady et al. | 370/15 |
| 4,858,224 | 8/1989 | Nakano et al. | 370/13 |
| 5,060,226 | 10/1991 | Gewin et al. | 370/15 |
| 5,265,089 | 11/1993 | Yonehara | 370/13 |

FOREIGN PATENT DOCUMENTS 60-206238 10/1985 Japan .
3-285427 12/1991 Japan .

Primary Examiner—Douglas W. Olms
Assistant Examiner—Ajit Patel
Attorney, Agent, or Firm—Greer, Burns & Crain, Ltd.

[57] ABSTRACT

A subscriber digital transmission system has a central office terminal and a remote terminal coupled to the central office terminal by a digital line, the remote terminal accommodating a plurality of subscribers. The system includes a communication unit for transmitting a multiple signal via the digital line between the central office terminal and the remote terminal, information being multiplexed in a plurality of time slots in the multiple signal, and a multiplexer for multiplexing information for the subscribers and performance information in accordance with a time-division multiprocessing so that the performance information is assigned to a predetermined time slot of the multiple signal to be transmitted by the communication unit.

14 Claims, 12 Drawing Sheets (a) 1 MULTI FRAME (b) TS = 8BITS (c) Fi (1 ≤ i ≤ n) : FRAME BITS

| FRAME NAME | FRAME NUMBER IN ONE MULTI FRAME | FUNCTION OF FRAME BITS |
|---|---|---|
| SLC-96 | 72 | SYNCHRONOUS DETECTION, SIGNALING INFORMATION DETECTION, DATA LINK (ALARME, MAINTENANCE) |
| SF | 12 | SYNCHRONOUS DETECTION, SIGNALING INFORMATION DETECTION, |
| ESF | 24 | SYNCHRONOUS DETECTION, SIGNALING INFORMATION DETECTION, CRC-INFORMATION |

NO CRC INFORMATION

SUBSCRIBER DIGITAL TRANSMISSION SYSTEM

RELATED APPLICATION

This is a continuation of application Ser. No. 08/032,868, filed on Mar. 18, 1993, now abandoned.

BACKGROUND OF THE INVENTION (1) Field of the Invention

The present invention generally relates to a subscriber digital transmission system, and more particularly to a subscriber digital transmission system in which information other than information for subscribers can be transmitted using a predetermined time slot in each frame.

(2) Description of the Related Art

In North America, subscribers are scattered over a wide land area, so that it is difficult to provide a plurality of central offices (CO) each of which offices accommodates a plurality of subscribers because of the high cost thereof. Thus, in North America, a subscriber digital transmission system has been proposed in which a central office communicates with subscribers via a remote terminal (RT).

Examples of a structure of the subscriber digital transmission system conventionally proposed are shown in FIGS.1 and 2.

Referring to FIG. 1, a central office (CO) is coupled to a remote terminal 38 (RT) accommodating a plurality of subscriber lines 24 using digital lines. The central office (CO) is provided with a local analog switch 31. Subscriber signals (A) (analog signals) switched by the local analog switch 31 are supplied to channel interfaces (CH INF) 32 in a central office terminal 37. Each of the channel interfaces 32 converts twenty-four analog subscriber signals (A) supplied thereto into twenty-four digital subscriber signals. The digital subscriber signals are supplied to a corresponding one of multiplexer/demultiplexer units (MLDM) 33 along with signaling information. Each of the multiplexer/demultiplexer units 33 multiplexes the twenty-four digital subscriber signals in accordance with a time-division multiplexing method, so that a multiplexed signal having a bit rate of 1.544 Mbps (Megabits per second) is output from each of the multiplexer/demultiplexer units 33. The multiplexing signal (1.544 Mbps) output from each of the multiplexer/demultiplexer unite 33 is supplied to an FP switching unit 34. When a problem occurs in an active transmission line, the FP switching unit 34 switches the signals on the active transmission line to a spare transmission line so as to prevent the communication from being interrupted. A TSI function for changing time slots for subscribers may be added to the FP switching unit 34. The multiplexed signal (1.544 Mbps) output from the FP switching unit 34 is supplied to each of line interfaces 35 (LIN INF). The multiplexed signal is coded by each of the line interfaces 35 in accordance with a predetermined algorithm (e.g. AMI or B8ZS). In each of the line interfaces 35, a unipolar/bipolar conversion process is applied to the multiplexed signal. As a result, a primary rate DS1 or T1 signal (B) is transmitted to the remote terminal 38 via each of the digital lines.

The remote terminal 38 is provided with line interfaces 35, the FP switching unit 34, the multiplexer/demultiplexer units 33 and the channel interfaces in the same manner as the central office terminal 37 in the central Office (CO). the above operations are performed in reverse so that the DS1 or T1 signal is divided into signals for the respective subscribers and the signals are distributed to the subscribers. The signal transmission from the remote terminal 38 to the central office (CO) is performed in the same manner as that described above.

In addition, a transmission operation support system (OS) 40 provided in the central office (CO) supervises via a controller 36 (CONT) alarms and changes of performance state occurring in the central office terminal 37 and the remote terminal 38 and carries out a setting of the operation mode.

In FIG. 2, the central office (CO) is provided with a local digital switch 39 (LDS) substituted for the local analog switch 31 (LAS) shown in FIG. 1. In this subscriber digital transmission system, interfaces in the local digital switch 39 can directly treat the DS1 signals. Operations performed in the system are the same as those in the system shown in FIG. 1.

The primary rate DS1 (or T1) signals standard in North America are transmitted through the digital lines between the central office (CO) and the remote terminal 38. The primary rate DS1 signal has a frame format as shown in FIG. 3 (a). According to the frame format shown in FIG. 3 (a), one frame is formed of a frame bit $F_i$ (i=1, 2, ..., n) and twenty-four time slots TS assigned to the subscribers. Voice signals, digital data or signaling information for each subscriber is transmitted in a corresponding one of the time slots TS in each frame of the DS1 signal. Each time slot TS contains 8 bits as shown in FIG. 3 (b). Thus, one frame contains 1 bit for the frame bit $F_i$ and 8×24=192 bits for the twenty-four time slots. Data of 193 (1+192) bits in each frame is transmitted for 125 microseconds in the digital line. That is, the data is transmitted at the rate of 1.544 Mbps.

A multi-frame includes n frames as shown in FIG. 3 (a). In general, data for one multi-frame is transmitted at once. The number n of frames included in one multi-frame to be transmitted at once depends on the frame format. There are three types of frame formats as shown in FIG. 3 (c). In an SLC-96 format, 72 frames are included (n=72) in one multi-frame, in an SF format, 12 frames are included (n=12) in one multi-frame, and in an ESF format, 24 frames are included (n=24) in one multi-frame. As one multi-frame contains n frames, n frame bits $F_i$ are contained in one multi-frame. In the subscriber digital transmission system, the n frame bits $F_i$ in one multi-frame are used for indicating information. In the case of the multi-frame having the SLC-96 format, the 72 frame bits are used for the synchronizaTION detection, for the detection of signaling information and for data link information for informing the destination of the maintenance and alarm information and the like. In the case of the multi-frame having the SF format, the 12 frame bits are used for the synchronization detection and for the detection of the signaling information. In the case of the multi-frame having the ESF format, the 24 frame bits are used for the synchronization detection, for the detection of the signaling information, for the data link information and for CRC-6 information (a cyclic code) for monitoring the performance state. The ESF format is a recent proposal, and is not very extensively used. On the other hand, the SLC-96 format and the SF format are extensively used.

In a transmission system using the SLC-96 format or the SF format, the bipolar violation (BPV) is used as a scale indicating the state of the transmission system. The unipolar signals handled in the terminals are converted into bipolar signals (information is indicated using positive and negative poles), and the bipolar signals are transmitted through the communication line formed of a T-line and an R-line.

The format of the bipolar signal depends on the coding rule. Two types of the coding rule, an AMI coding rule and a B8ZS coding rule, are often used. It is detected using the bipolar violation (BPV) whether or not coding rule errors occur because of the performance of the transmission system (the communication lines and the terminals), and the transmission quality is checked.

In a case where digital services (e.g. DDS and ISDN) are provided in the subscriber digital transmission system, the transmission quality cannot be adequately checked by use of the bipolar violation (BPV) alone, for the following reasons.

The coding rule errors of the bipolar signals can be detected by use of the bipolar violation (BPV). However, bit errors in data cannot be detected by use of the bipolar violation (BPV). That is, the logical errors occurring in data cannot be detected. This is the problem in the case where the digital services (e.g. DDS and ISDN) are performed in the subscriber digital transmission system.

As the logical errors occurring in data cannot be detected by use of the bipolar violation, it is impossible to adequately estimate whether malfunctions are occurring in the subscriber digital transmission system and to switch communications to a spare communication line.

As a result, it is impossible for the transmission operation support system (OS) in the central office (CO) to supervise the transmission quality due to the logical errors in the transmission system.

On the other hand, according to the ESF format, CRC-6 information can be transmitted by use of the frame bits $F_i$ in each multi-frame. The logical errors occurring in the system can be detected by use of the CRC-6 information. However, subscriber digital transmission systems in which the DS1 (T1) signal having the ESF format are transmitted through the communication lines are not widespread. Thus, to detect the logical errors in the transmission system using the CRC-6 information, the switch and transmission equipments in the present system must be replaced with those for the ESF format. In this case, the cost required for replacing the switches and the transmission equipments in all the systems in the country is very high.

Further, in the case of the SF format, the data link information such as alarm information and maintenance information cannot transmitted by the frame bits $F_i$ in each multi-frame. Thus, to transmit the data link information in the subscriber transmission system, the switch and the transmission equipments must be replaced with those for either the SLC-96 format or the ESF format. In this case, the same cost problem arises asfor the above case.

SUMMARY OF THE INVENTION

Accordingly, the general object of the present invention is to provide a novel and useful subscriber digital transmission system in which the disadvantages of the aforementioned prior art are eliminated.

A more specific object of the present invention is to provide a subscriber digital transmission system in which information other than information for the subscribers can be transmitted using a predetermined time slot in each frame.

Another object of the present invention is to provide a subscriber digital transmission system in which performance information indicating the logical error status in the transmission system can be transmitted using a predetermined time slot in each frame.

A further object of the present invention is to provide a subscriber digital transmission system in which supervisory information such as alarm information and maintenance information can be transmitted using a predetermined time slot in each frame.

The above objects of the present invention are achieved by a subscriber digital transmission system in which a first terminal and second terminal are coupled to each other by a digital line, the second terminal accommodating a plurality of subscribers, the system comprising: communication means for transmitting a multiple signal via the digital line between the first terminal and the second terminal in which multiple signal information is multiplexed in a plurality of time slots; and multiplexing means, coupled to the communication means, for multiplexing first information for the subscribers and second information other than the first information for the subscribers in accordance with a time-division multiprocessing so that the second information is assigned to a predetermined time slot of the multiple signal to be transmitted by the communication means.

According to the present invention, the first information for subscribers and the second information other than the first information is multiplexed in accordance with the time-division multiprocessing so that the second information is assigned to a predetermined time slot, and the multiplexed signal is transmitted between the first and second terminal. Thus, the second information, such as the performance information, the alarm information and the maintenance information, can be transmitted using the predetermined time slot in the multiplexed signal.

Additional objects, features and advantages of the present invention will be apparent from the following detailed description when read in conjunction with the accompanying drawings.

DESCRIPTION OF THE PREFERRED EMBODIMENTS

A description will now be given, with reference to FIG. 4, of the principle of a first embodiment of the present invention.

Figure 4:
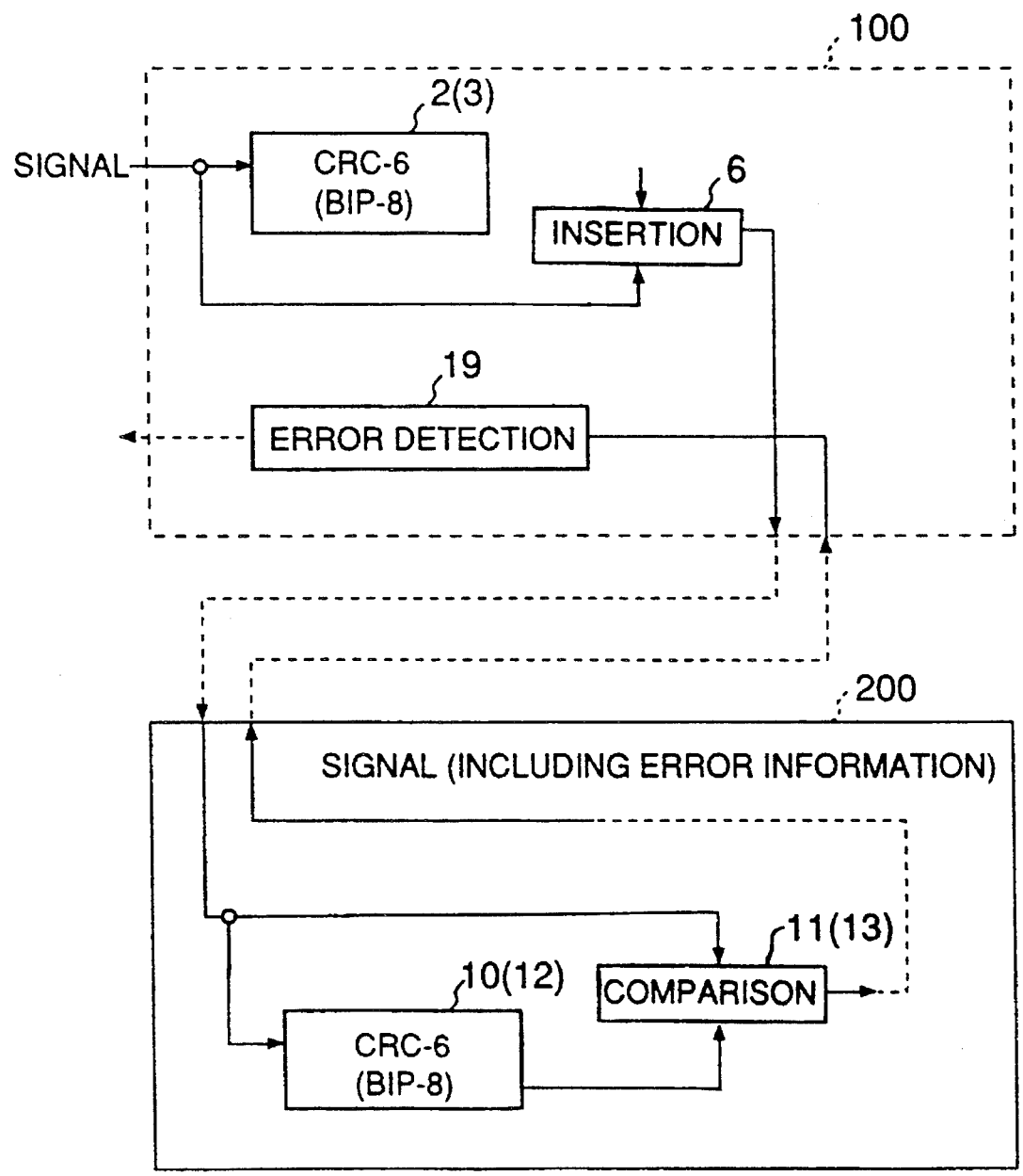
FIG. 4 is a block diagram illustrating the principle of a first embodiment of the present invention.

Referring to FIG. 4, a transmitting terminal 100 has a calculation portion 2, an inserting portion 6 and an error detecting portion 19. The calculation portion 2 performs a CRC-6 calculation on a signal, such as the DS1 signal, to be transmitted. The inserting portion 6 inserts calculation result information obtained by the calculation portion 2 into a first time slot in each frame of the signal. The signal output from the inserting portion 6 is transmitted by the transmitting terminal 100 to a receiving terminal 200. The receiving terminal 200 has a recalculating portion 10 and a reference portion 11. The recalculating portion 10 performs the CRC-6 calculation again on the signal received by the receiving terminal 200. The reference portion 11 compares the calculation result information extracted from the first time slot in each frame with calculation result information obtained by the recalculating portion 10, and inserts error information corresponding to the comparison result obtained by the reference portion 11 into a second time slot in each frame of the signal received by the receiving terminal 200. The signal with the error information inserted into the second time slot in each frame is returned to the transmitting terminal 100. The signal returned from the receiving terminal 200 to the transmitting terminal 100 is supplied to the error detecting portion 19. The error detecting portion 19 extracts the error information from the second time slot in each frame.

Figure 5:
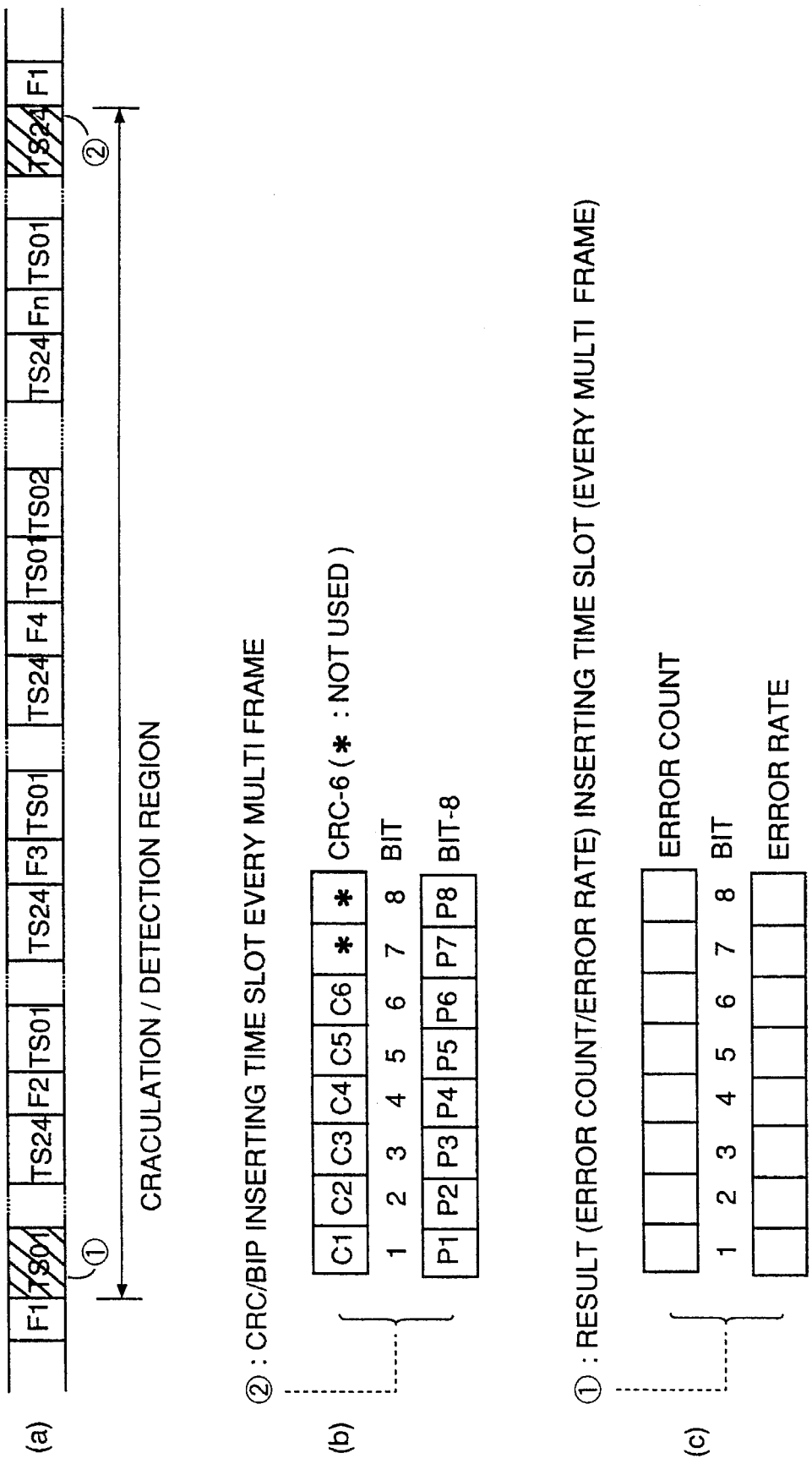
FIG. 5 shows in part (a) a diagram illustrating a structure of each frame of the DS1 signal transmitted in the subscriber digital transmission system according to the first embodiment of the present invention, in part (b) a diagram illustrating time slots in which the CRC-6 information and the BIP-8 information are inserted, and in part (c) a diagram illustrating time slots in which calculation results corresponding to the CRC-6 information and BIP-8 information are inserted.

The DS1 signal transmitted between the transmitting terminal 100 and the receiving terminal 200 has a frame format, for example that shown in FIG. 5 (a). In this case, the calculation result information obtained by the calculating portion 2 of the transmitting terminal 100 is inserted into the time slot $TS_{24}$ (the last time slot) in each frame. The calculation result information obtained by the CRC-6 calculation is indicated, for example, by six bits (C1, C2, C3, C4, C5 and C6) as shown in FIG. 5(b). In the receiving terminal 200, the reference portion 11 increments an error count value by one every time an error is detected based on the comparison result, and inserts the error count value into the time slot $TS_{01}$ as the error information. The error count value is indicated, for example, by 8 bits in the time slot TS01 as shown in FIG. 5(c). In the transmitting terminal 100, the error detecting portion 19 extracts the error count value (the error information) from the time slot $TS_{01}$ in each frame of the signal returned from the receiving terminal 200. The performance of the transmitting system is supervised by the error count value extracted by the error detecting portion 19.

The calculation portion may apply the BIP-8 calculation to the signal (the DS1 signal) instead of the CRC-6 calculation. In this case, the calculation result information obtained by the calculating portion 2 in the transmitting terminal 100 is indicated by 8 bits (P1, P2, P3, P4, P5, P6, P7, and P8) as shown in FIG. 5(b). The reference portion 11 in the receiving terminal 200 calculates the error rate every time detecting an error based on the comparison result as the error information, the error rate being a rate by which the error occurs. The error rate indicated by 8 bits is inserted into the time slot $TS_{01}$ in every frame of the signal returned to the transmitting terminal 100, as shown in FIG. 5(c). That is, in this case, the performance of the transmitting system is supervised based on the error rate extracted from the time slot $TS_{01}$ by the error detecting portion 19.

A description will now be given, with reference to FIG. 6, of the second embodiment.

Figure 6:
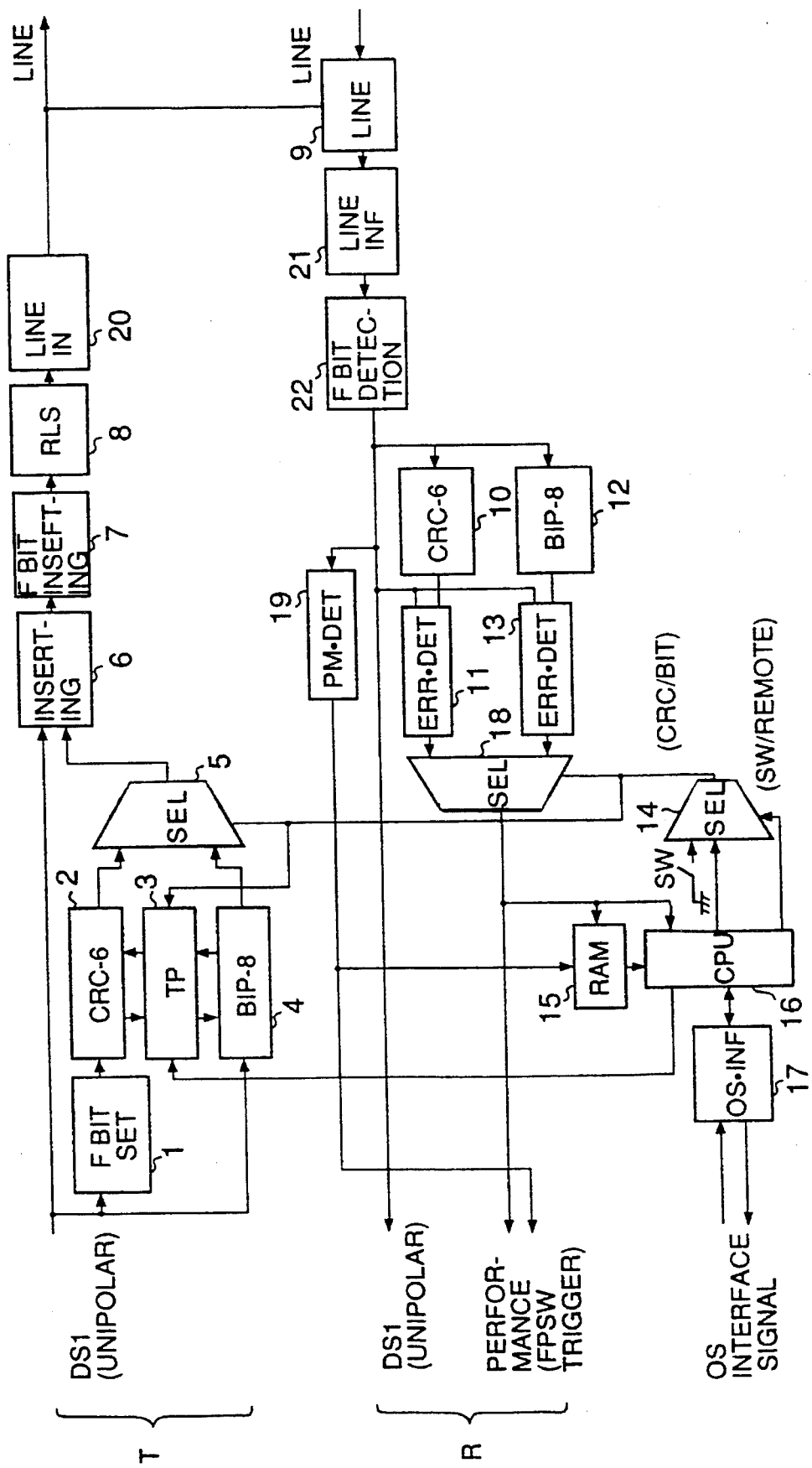
FIG. 6 is a block diagram illustrating the first embodiment of the present invention.

A circuit shown in FIG. 6 is divided into a transmitting side T and a receiving side R. The circuit shown in FIG. 6 is formed in either the modulator/demodulator unit 3 (MLDM) or the line interface 5 (LINE INF) shown in FIGS.1 and 2. In the transmission side T, there are provided a frame bit setting circuit 1, a CRC-6 calculation circuit 2, a test pattern generator 3, a BIP-8 calculation circuit 4, a selector 5 for selecting one from the CRC-6 calculation circuit 2 and the BIP-8 calculation circuit 4, an inserting circuit 6, a frame bit inserting circuit 7, a remote loop back (RLB) controller 8, a line interface 20. In the receiving side R, there are provided a local loop back (LLB) controller 9, a line interface 21, a frame bit detecting circuit 22, a CRC-6 recalculation circuit 10, a CRC-6 error detecting circuit 11, a BIP-8 recalculation circuit 12, a BIP-8 error detecting circuit 13, a selector 14, a RAM (random access memory) 15, a CPU (central processing unit) 16, an OS interface 17, a selector 18, and a performance information detecting circuit 19.

The frame bit F in each frame of the unipolar DS1 signal in the transmission side R is set to "1" by the frame bit setting circuit 1. The CRC-6 calculation circuit 2 then performs the CRC-6 calculation to the unipolar DS1 signal.

Here, logical errors are detected using the calculation result of the CRC-6 calculation as follows.

In a bit stream in one multi-frame, the frame bits $F_i$ are set to "1". The polynomial of X having coefficients, each of which corresponds to one of the bit data (1 or 0) in the bit stream, are multiplied by $X^6$. The polynomial obtained by the multiplication is divided by the creation polynomial $(X^6+X+1)$. The remainder of the division, which residual is indicated by 6 bits, is used as the CRC bits (the calculation result obtained by the CRC-6 calculation circuit 2). In the destination terminal by which the signal including the CRC bits is received, the CRC-6 recalculation is performed in the same manner as described above. If the CRC bits obtained by the CRC-recalculation and the CRC bits included in the signal received are the same, it is determined that a logical error has not occurred in the transmission system. On the other hand, if the CRC bits obtained by the CRC-recalculation and the CRC bits included in the signal received differ from each other, it is determined that a logical error has occured in the transmission system.

The BIP-8 calculation circuit 4 performs the BIP-calculation to the unipolar DS1 signal in the transmitting side T.

Figure 7:
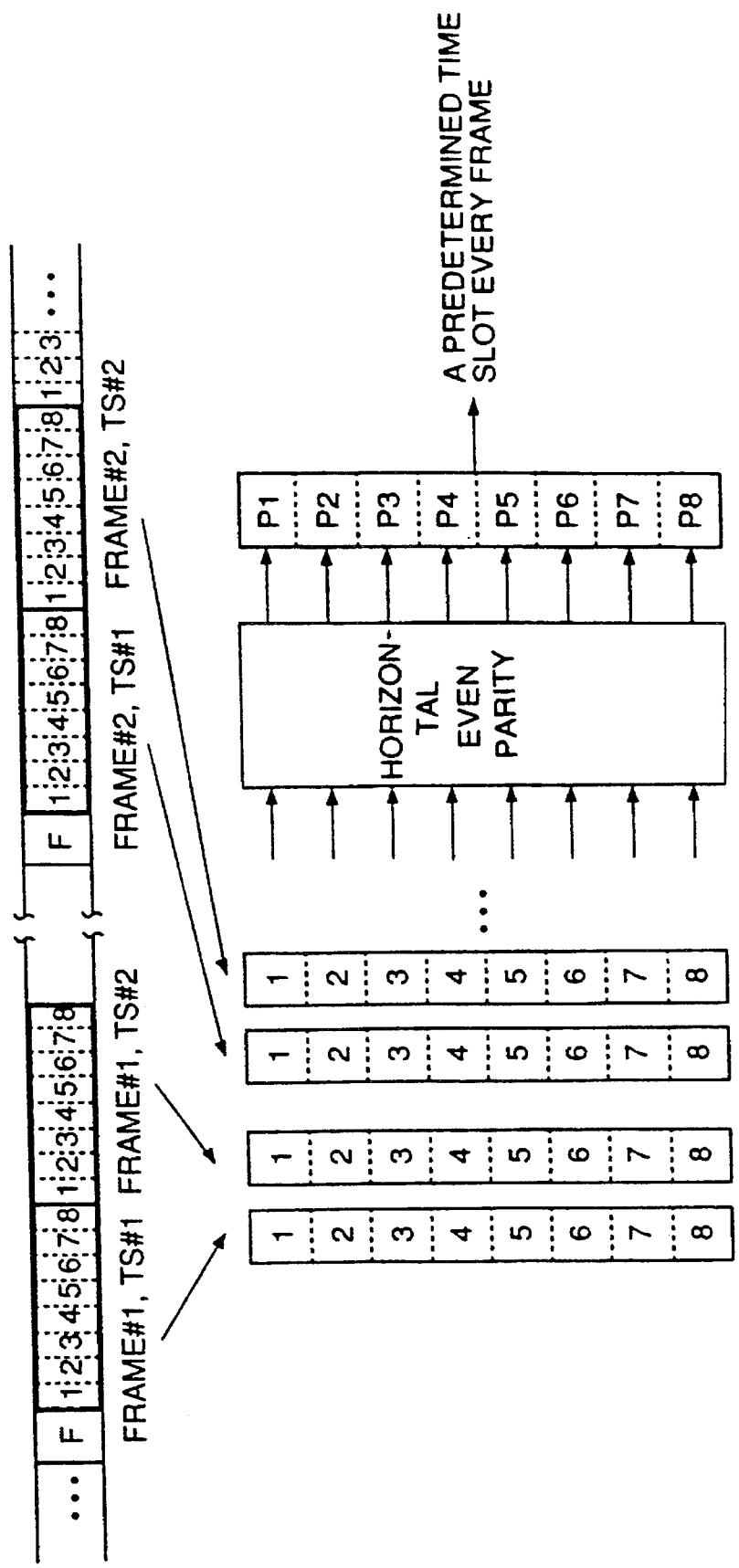
FIG. 7 is a diagram illustrating a process for detecting errors using the BIP-8 (bit interleaved parity) information.

Here, the BIP-8 calculation is performed as shown in FIG. 7. The frame bits F are removed from the unipolar DS1 signal. The horizontal/even parity of 8 bits at the same position in the predetermined time clots (TS#1 and TS# in the frame #1 and TS#1 and TS#2 in the frame #2) is calculated. The calculation result (the horizontal/even parity) is inserted into a predetermined time slot in each multi-frame and is transmitted to the destination terminal. In the destination terminal, the BIP-8 recalculation is performed to the received signal in the same manner as described above. If the calculation result obtained by the BIP-8 recalculation and the calculation result inserted into the predetermined time slot in each multi-frame are the same, it is determined that a logical error has ot occurred in the transmission system. On the other hand, if the calculation result obtained by the BIP-8 recalculation and the calculation result inserted into the predetermined time slot in each multi-frame differ from each other, it is determined that the logical error occurs in the transmission system.

Returning to FIG. 6, the selector 5 selects either the CRC-6 calculation circuit 2 or the BIP-8 calculation circuit 4 in accordance with a control signal supplied from the selector 14. The calculation result output from either the CRC-6 calculation circuit 2 or the BIP-8 calculation circuit 4 is supplied to the inserting circuit 6 via the selector 6. The inserting circuit 6 inserts the calculation result into a time slot (e.g. $TS_{24}$). The frame bit has been compulsorily set to "1" by the frame bit setting circuit 1. Thus, the frame bit inserting circuit 7 changes the frame bit from "1" to correct values (0 or 1).

The remote loop back controller (RLB) 8 and the local loop back controller (LLB) 9 are used for assuming a location at which the malfunction has occurred. In a case where it is determined based on the error count value (the performance information) that the transmission quality has deteriorated, the local loop back (LLB) controller 8 in the central office terminal COT (see FIG. 1) is, for example, activated. The signal is processed in only the central office terminal without being transmitted to the remote terminal RT. In this state, if the logical error disappears, it can be assumed that the deterioration of the transmission quality depends on problems occurring in the remote terminal RT and/or in the communication lines. In addition, if the logical error disappears when the remote loop back (RLB) controller 8 in the central office terminal COT is activated, it can be assumed that the deterioration of the communication quality depends on the problems occurring in the remote terminal. As a result, the maintenance of the transmission system can be easily performed using the above determination results.

The DS1 signal received via the local loop back (LLB) controller 9 and the line interface 21 is supplied to the frame bit detecting circuit 22. The frame bit detecting circuit 22 sets the frame bits to "1" and supplies the DS1 signal to the CRC-6 recalculation circuit 10 and the BIP-8 recalculation circuit 12. The error detecting circuit 11 extracts the calculation result (the CRC-6 information) from the time slot $ST_{24}$ in each frame of the DS1 signal and compares the calculation result (the CRC-6 information) to the calculation result output from the CRC-6 recalculation circuit 10. It is then determined based on the comparison result obtained by the error detecting circuit 11 whether or not a logical error has occurred in the transmission system. The error count value is generated as the error information based on the determination result. The DS1 signal is also processed by the BIP-8 recalculation circuit 8 and by the error detecting circuit 13 so that the error rate is obtained as the error information as described above.

The selector 18 selects the error information output from either the error detecting circuit 11 or 13 in accordance with the control signal supplied from the selector 14. An output signal from the selector 18 is supplied to the RAM 15 via the CPU 16 as the performance information indicating the performance status of the transmission system. At this time. the CPU 16 provides the time parameter indicating a time at which the performance data is obtained to the performance data. Thus, the performance data is stored in the RAM 15 along with the time parameter. The performance data is also supplied to the FP switching unit 34 (see FIG. 1) along with the time parameter. In the FP switching unit 34, the performance data can be used as trigger information for switching between a communication line and a spare communication line.

The error information (the performance data) obtained as described above is inserted into the time slot $ST_1$ in the destination terminal. A response signal in which the error information has been inserted into the time slot $ST_1$ is returned to this terminal. When the response signal is received by this terminal, the performance information detecting circuit 19 extracts the error information (the error count value or the error rate) from the time slot $TS_1$ in each frame of the response signal, The error information output from the performance information detecting circuit 19 is stored in the RAM 15 along with the time parameter and is supplied to the FP switching circuit 34 (see FIG. 1).

Figure 1:
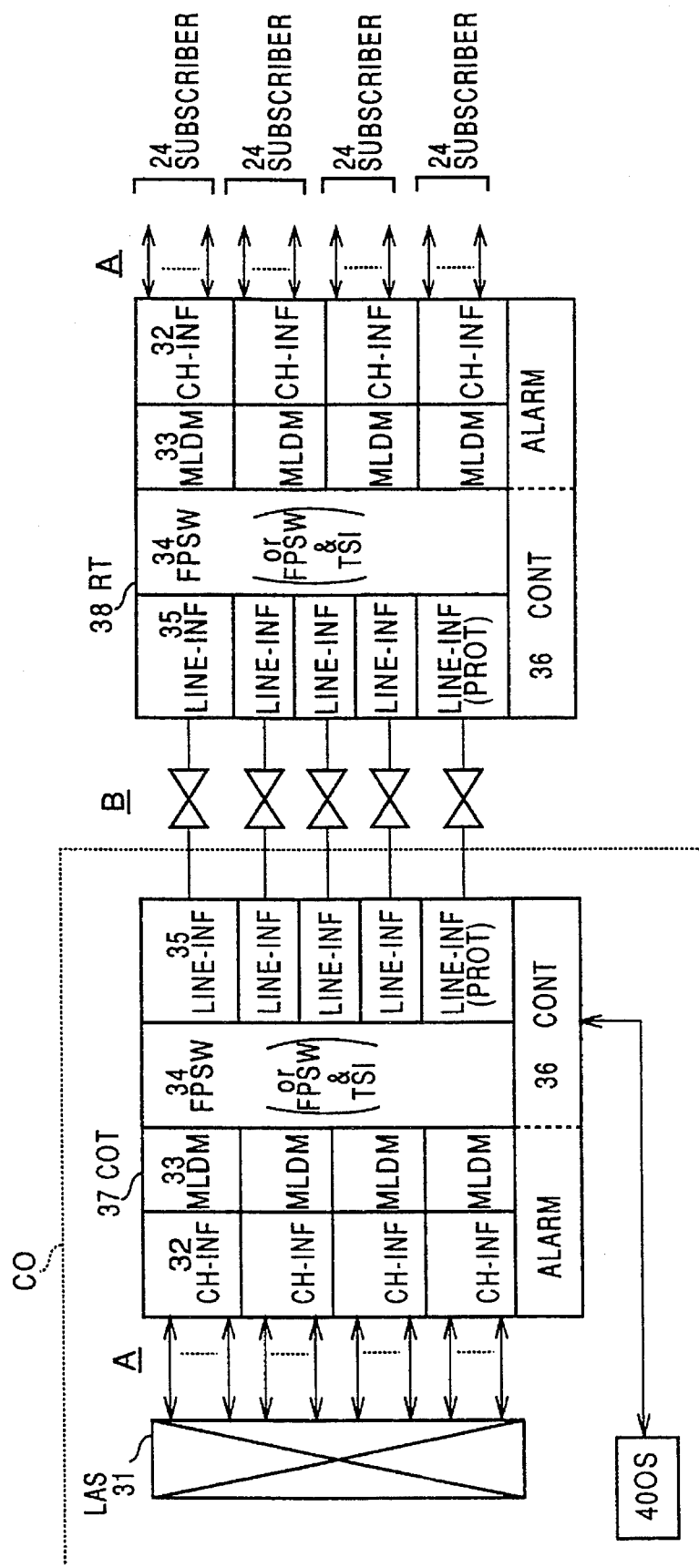
FIG. 1 is a block diagram illustrating an example of a structure of a subscriber transmission system.
Figure 2:
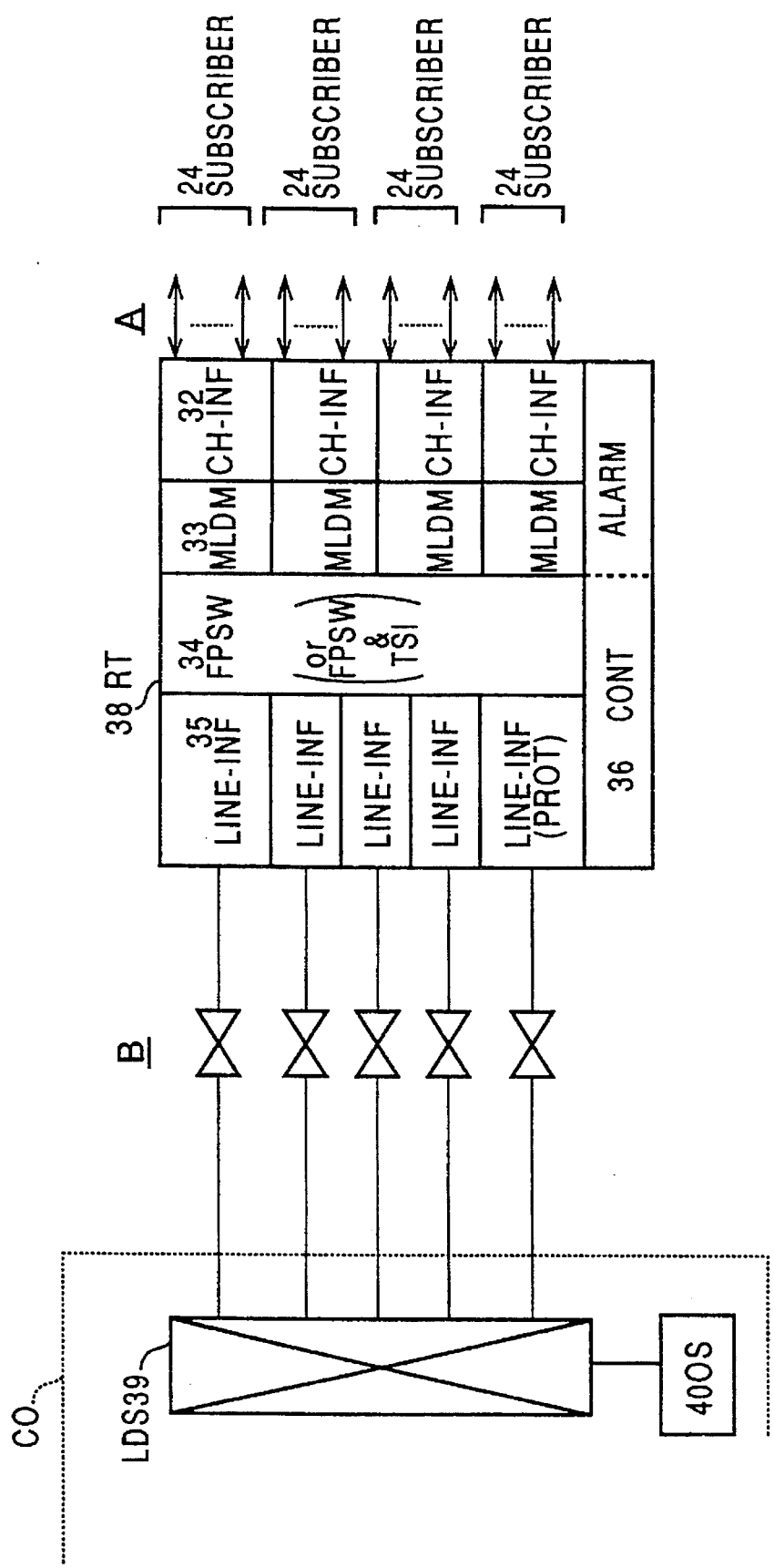
FIG. 2 is a block diagram illustrating another example of a structure of the subscriber transmission system.
Figure 3:
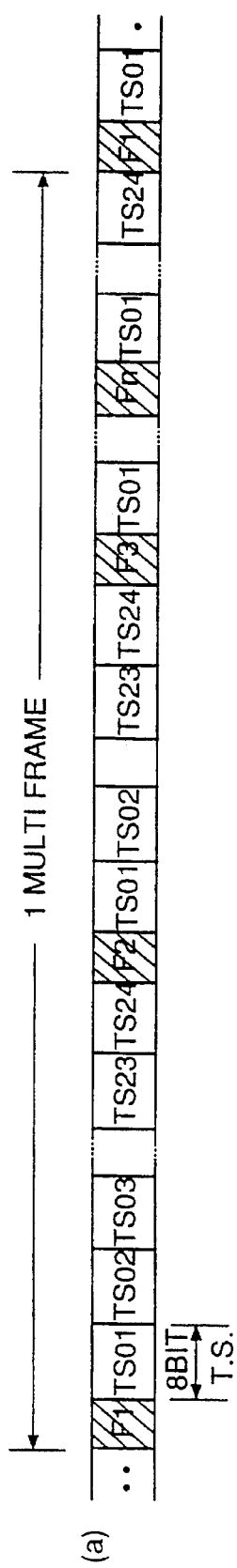
FIG. 3 shows in part (a) a diagram illustrating a structure of each frame of a DS1 signal, in part (b) a diagram illustrating a structure of each time slot in each frame shown in part (a), and in part (c) a table illustrating features of frame formats SLC-96, SF and ESF.

The selector 14 selects either a switch SW connected to the ground or an output terminal of the CPU 16. The control signal for selecting either the CRC-6 calculation mode or the BIP-8 calculation mode is supplied from the CPU 16 to the selector 5 and 18 via the selector 14. The control signal can be also made by the switch SW. The test pattern generator 3 outputs a predetermined error pattern signal in accordance with an instruction from the CPU 16. The error pattern signal is inserted into a predetermined time slot in the DS1 signal by the CRC-6 calculation circuit 2 and the BIP-8 calculation circuit 3. The self checking of the transmission quality in the transmission system can be performed using the DS1 signal in which the test pattern signal is inserted into the predetermined time slot, in the same manner as described above.

the OS interface 17 coupled to the transmission operation support system (OS) (see FIG. 1). Various commands are supplied from the transmission operation support system (OS) to the CPU 16 via the OS interface 17. In addition, the performance data stored in the RAM 15 is read out by the CPU 16 and is supplied to the transmission operation support system (OS) via the OS interface 17.

According to the first embodiment, the CRC-6 calculation result or the BIP-8 calculation result is transmitted to the destination terminal using a predetermined time slot in the DS1 signal, and the performance data calculated using the CRC-6 or BIP-8 calculation result in the destination terminal is returned to the active terminal by using a predetermined time slot in the response signal. Thus, even if the signal to be transmitted has the SLC-69 format or the SF format, a logical error can be detected. That is, a logical error occurring in the transmission system can be detected without replacing the equipments and the switches with equipment appropriate for the ESF format.

A description will now be given, with reference to FIG. 8, of the principle of a second embodiment of the present invention.

Figure 8:
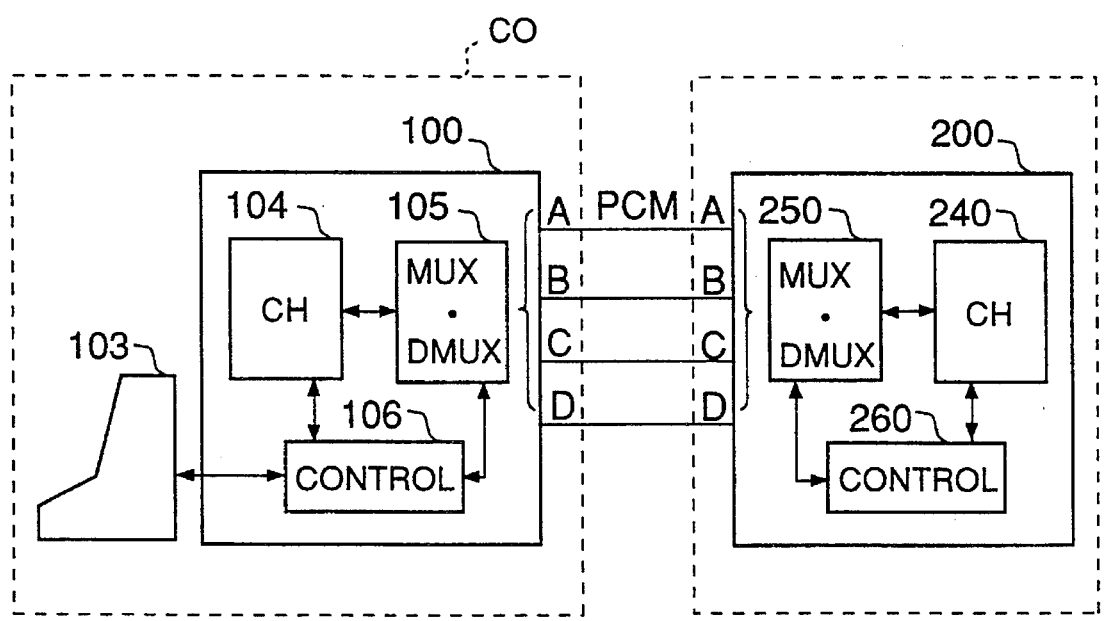
FIG. 8 is a block diagram illustrating the principle of a second embodiment of the present invention.

Referring to FIG. 8, a central office (CO) is provided with a central office terminal 100 which is connected to a remote terminal 200 (RT) for subscribers by PCM lines. The central office (CO) is further provided with a control terminal unit 103 which may be operated by operators. The central office terminal 100 and the remote terminal 200 are provided with control boards 106 and 260, multiplexer/demultiplexer board units (MUX/DMUX) 105 and 250, channel board units 104 and 240. The MUX/DMUX units 105 and 250 can process signals having SF frame format. When a start instruction for a test mode operation is supplied from the control terminal unit 103 to the control board 106 of the central office terminal 100, the control board 106 sends a message whether or not the test mode operation can be performed to the remote terminal 100 using a channel in the channel board unit 104 and the MUX/DMUX board unit 105. The message received by the remote terminal 200 is supplied to the channel board unit 240 via the MUX/DMUX board unit 250 and the control board 260. When both the channel board units 104 and 240 are in a state where the test mode operation can be performed, the test mode operation is performed. In the test mode operation, test signals output from the control board 106 of the central office terminal 100 are transmitted to the remote station terminal 200 using the channel board unit 104 and the MUX/DMUX board unit 105. The test signals received by the remote terminal 200 are supplied to the control board 260 via the MUX/DMUX board unit 250 and the channel board unit 240. The control board 260 determines a state of the test signals. The control board 260 outputs the determination result, and the determination result is then transmitted from the remote terminal 200 to the central office terminal 100. The determination result is then supplied to the control terminal unit 103.

In the test mode operation, the test signals may be supplied from the control board 260 of the remote terminal 200 to the control board 106 of the central terminal office 100. In this case, the control board 106 of the central office terminal 106 determines the state of the test signals and the determination result is supplied from the control board 106 to the terminal control unit 103.

After the test mode operation is completed, the control board 106 of the central office terminal 100 may transmit an instruction for releasing the state of the test mode operation to the control board 260 of the remote terminal 200.

A description will now be given, with reference to FIGS. 9 and 10, of the second embodiment of the present invention.

Figure 9:
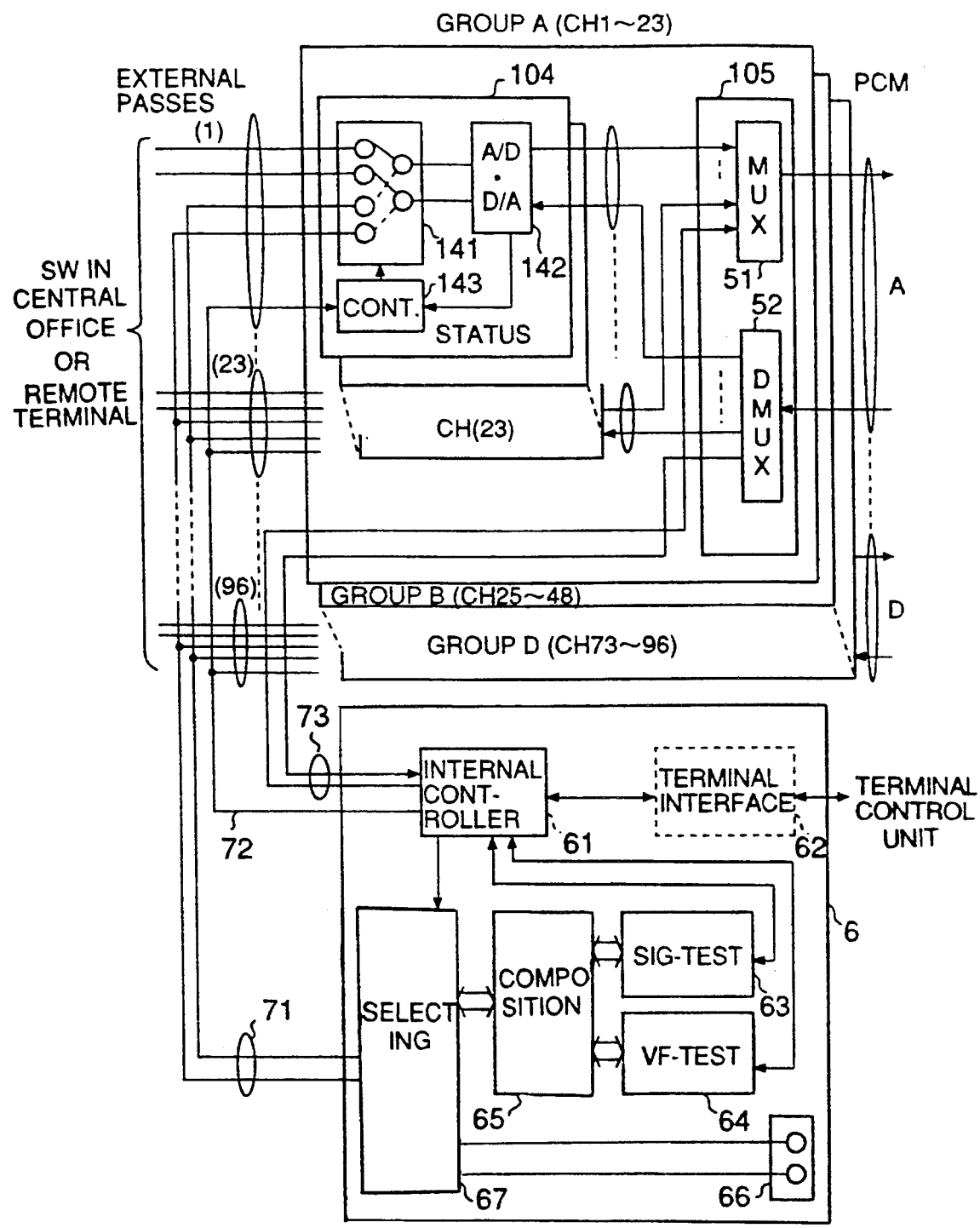
FIG. 9 is a block diagram illustrating the second embodiment of the present invention.

FIG. 9 shows a detailed structure of the central office terminal 100. In the second embodiment, the central office terminal 100 and the remote terminal 200 are connected with each other by four PCM lines A, B, C and D, as shown in FIG. 8, each line being provided with 24 channels. Thus, all the PCM lines are provided with 96 channels. The control board 106 of the central office terminal 100 uses a channel in, for example, the PCM line A (including 24 channels) for the test mode operation. Thus, the remaining 95 channels in the PCM lines are checked in the test mode operation Referring to FIG. 9, the channel board unit 104 and the MUX/DMUX board unit 105 are divided into four groups A, B, C and D which are respectively coupled to the PCM lines A, B, C and D. The group A is provided with twenty-three channel boards 104(1)–104(23), a multiplexer portion 51 and a demultiplexer portion 52. The multiplexer portion 51 is constituted for the SF frame format and is connected to the twenty-three channel boards 104(1)–104(23) and to a control communication wire 73. The demultiplexer 51 is also constituted for the SF frame format and distributes received signals for twenty-three channels to the channel boards 104(1)–104(23). The demultiplexer 51 supplies a receiving signal for a predetermined channel the control board 106 via the communication wire 73. Each of the gropes B, C and D is provided with the channel board unit 104 and the MUX/DMUX board unit for twenty-four channels. Each of the channel boards is provided with a test mode relay 141, an A/D and D/A converter 142 and control portion 143. The test mode relay 141 performs a switching operation between external paths and channel test signal wires (2W) 71. The A/D and D/A converter connects 142 connects the test mode relay 141 to the MUX/DMUX board unit 105 and performs an analog-to-digital conversion operation and a digital-to-analog conversion operation. The control portion 143 performs a switching control of the test mode relay 141 and receives status information for each channel from the A/D and D/A converter 142, the status information indicating a state in which each channel is used for communication. The control board 106 is provided with a terminal interface 62, an internal control board 61, a signal testing circuit 63, a data testing circuit 64 and a composition circuit 65. The terminal interface 62 is coupled to the control terminal unit 103, and detects the start instruction supplied from the control terminal unit 103 for the test mode operation. When the terminal interface 62 receives the start instruction, the internal controller 61 inquires of the channel board unit 104 whether or not the test mode operation can be performed and sends a message whether or not the test mode operation can be performed to the channel board unit 240 in the the remote terminal 100 using a channel. The signal testing circuit 63 generates a calling signal and a call-in signal. The data testing circuit 64 generates voice data signals The composition circuit 64 superposes both the signals supplied from the signal testing circuit 63 and the data testing circuit 64 on each other. The control board 106 includes a jack 66 and a selecting circuit 67. The jack 66 and the selecting circuit 67 can be removed from the control board 106. The jack 66 is used for connecting an external testing circuit (not shown) to the selecting circuit 67. The selecting circuit 67 selects either the composition circuit 65 or the external testing circuit connected to the jack 66 based on a control signal supplied from the internal controller 61.

The remote terminal 200, connected to the central office terminal 100 by the four PCM lines A, B, C and D, has almost the same structure as the central office terminal 100 described above. That is, the channel board unit 240 and the MUX/DMUX board unit 250 are divided into four groups A, B, C, and D respectively coupled to the PCM lines A, B, C and D. The remote terminal 200 is provided with no control terminal unit (103). Thus, the control board 260 is also provided with no terminal interface (62). Hereinafter, in the remote terminal 200, those parts which are the same as those in the central office terminal 100 shown in FIG. 9 are given the same reference numbers.

The test mode operation in the transmission system described above will be described bellow, with reference to FIGS. 10A, 10B and 10C.

Figure 10A:
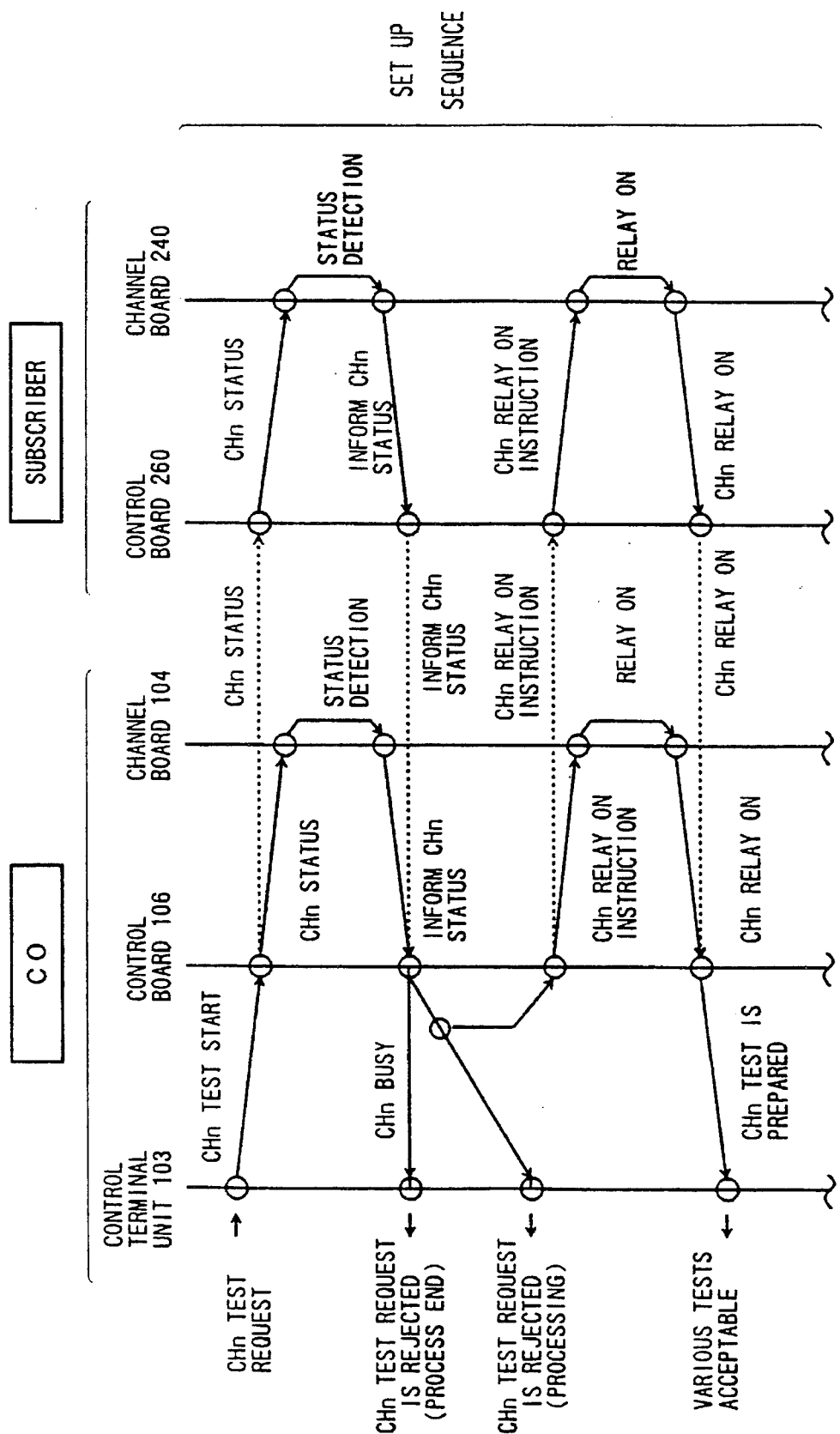
FIGS. 10A, 10B and 10C are diagrams illustrating a test mode protocol in the subscriber digital transmission system according to the second embodiment of the present invention.

FIG. 10A shows a set up sequence of the test mode operation. Referring to FIG. 10A, the control terminal unit 103 sends the start instruction of the test mode operation for a channel CHn (n=1–23, 25–96) to the control board 106 of the central office terminal 100, and the start instruction is received by the terminal interface 62. When the start instruction is supplied to the internal controller 61 via the terminal interface 62, the internal controller 61 sends a CHn status request instruction to the channel board 104(n) for the channel CHn via a channel control signal wire 72 to determine whether or not the channel board 104(n) is busy. The control portion 143 of the channel board 104(n) detects a status information indicating a state of the control portion 143 itself from the A/D and D/A converter 142. The channel board 104(n) returns response information, so called a CHn status notification (including the status information), to the internal controller 61 of the control board 106.

Further, the controller 61 sends the CHn status request instruction to the remote station 200 in a time slot of a channel CH24 assigned to the control board 106 via the multiplexer portion 51 and the PCM line A. The time slot of the channel CH24 is selected by a signal supplied from the control board 106 via the control communication wire 73.

In the remote station 200, the CHn status request instruction is supplied to the internal controller 61 of the control board 260 in a time slot of the channel CH24 via the demultiplexer portion 52 of the MUX/DMUX board unit 250. After this, the control board 260 supplies the CHn status request instruction to the channel board 240(n) corresponding to the channel CHn using the channel control signal wire 72. When the channel board 240(n) receives the CHn status request instruction, the channel board 240(n) detects a status information indicating a state of the control portion 43 itself from the A/D and D/A converter 42. The channel board 240(n) then returns response information, so called a CHn status notification (including the status information), to the control board 260. The CHn status notification is inserted into the time slot TS24 of the channel CH24 by the multiplexer portion 51 of the MUX/DMUX board unit 250 and is transmitted to the the central office terminal 100.

In the central office terminal 100, the CHn status notification is demultiplexed as information in the time slot TS24 of the channel CH24 by the demultiplexer portion 52 of the MUX/DMUX board unit 105, and is supplied to the internal controller of the control board 106 via the control communication wire 73.

If the internal controller 61 determines, based on the CHn status notification, that the channel board 104(n) or 240(n) in the central office terminal 100 or the remote terminal 200 is busy, a CHn busy information is supplied from the internal controller 61 to the terminal control unit 103 via the terminal interface 62. When the controller 106 outputs the CHn busy information, the test mode operation is not performed. If the internal controller 61 determines that both the channel boards 104(n) and 240(n) are not busy, the internal controller 61 supplies unoccupied CHn information to the terminal control unit 103 via the terminal interface 62. That is, the controller 106 informs of the terminal control unit 103 that the test mode operation can be performed. In a state where the test mode operation can be performed, the control board 106 supplies an ON instruction for making the test mode relay 141 be in the ON state to the control portion 143 of the channel board 104(n). When the control portion 143 receives the ON instruction, the control portion 143 makes the test mode relay 141 be in the ON state. As a result, the test mode relay 141 switches the external passes to the channel test signal wires 71. The control portion 143 supplies a response signal indicating that the test mode relay 141 has been turned on to the internal controller 61 of the control board 106 via the channel control signal wire 72. The control board 106 supplies the ON instruction to the multiplexer portion 51 of the MUX/DMUX board unit 105 via the control communication wire 73, and the ON instruction is transmitted to the remote terminal 200 using the time slot TS24 of the channel CH24.

In the remote station 200, the ON instruction is sent from the demultiplexer 52 of the MUX/DMUX board unit 250 to the internal controller 61 of the control board 260 via the control communication wire 73 in the time slot TS24 of the channel CH24. The internal controller 61 supplies the ON instruction to the control portion 143 of the channel board 240(n) via the test signal wire 71. The control portion 143 controls the test mode relay 141 in accordance with the ON instruction so that the test mode relay 141 is turned on. As the result, in the remote terminal 200, the test mode relay 141 switches from the external passes to the channel test signal wires 71 so that the channel board 240(n) is coupled to the channel test signal wires 71. After this, the control portion 143 supplies a response signal indicating that the test mode relay 141 has been turned on to the internal controller 61 of the control board 260 via the channel control signal wire 72. The control board 260 supplies the response signal to the multiplexer portion 51 of the MUX/DMUX board unit 250 via the control communication wire 73, and the response signal is transmitted to the central office terminal 100 using the time slot TS24 of the channel CH24.

In the central office terminal 100, the demultiplexer portion 52 of the MUX/DMUX board unit 105 receives the response signal in the time slot TS24 of the channel CH24, and the response signal is supplied to the internal controller 61 of the control board 106. Here, when the control board 106 determines that the test mode relays 141 in both the central office terminal 100 and the remote terminal 200 have been turned on, the control board 106 supplies all-set information indicating that the system has been in a state where the test mode operation can be performed to the control terminal unit 103.

Figure 10B:
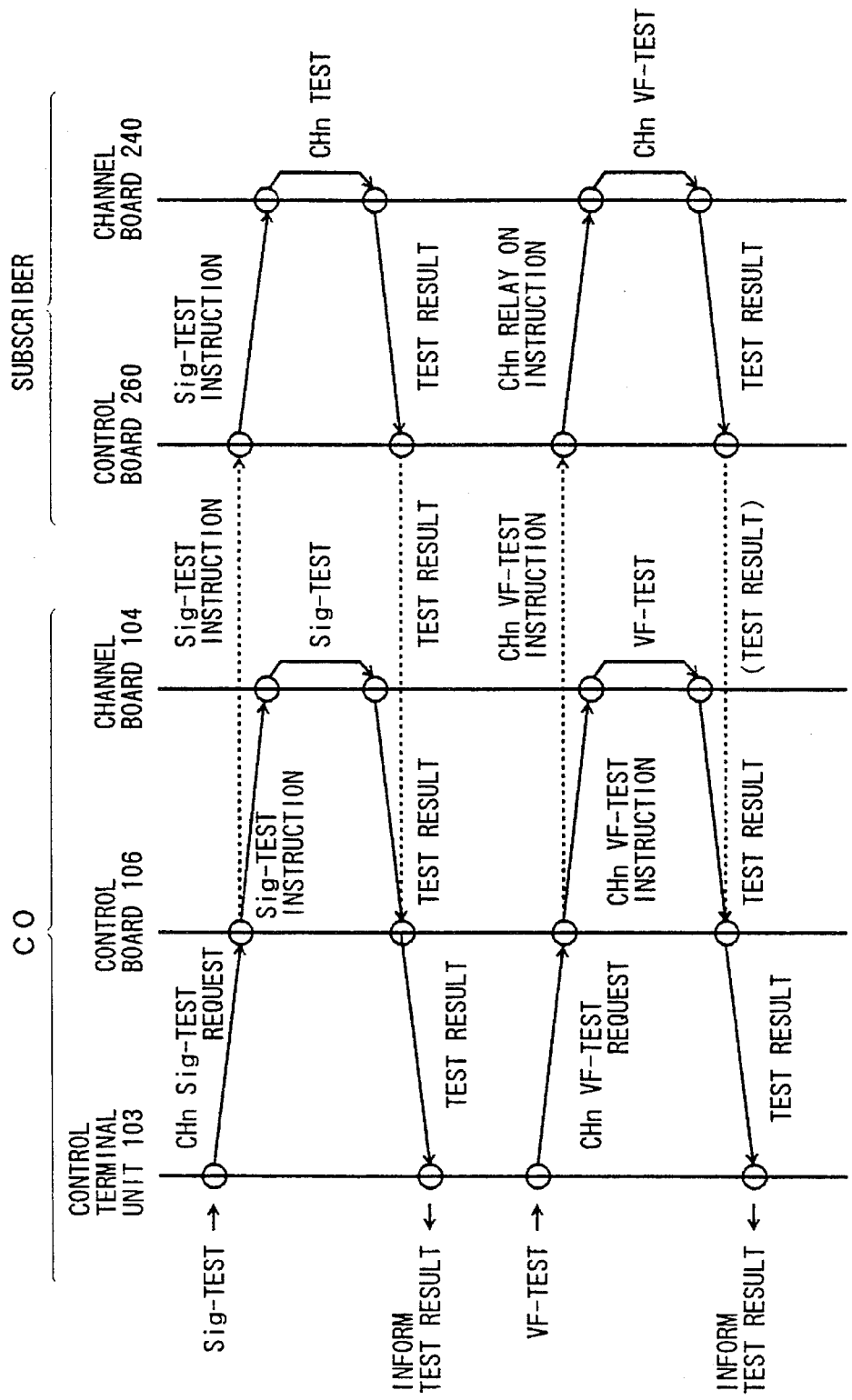

The test mode operation is performed in accordance with a procedure as shown in FIG. 10B.

Referring to FIG. 10B, when the control terminal unit 103 supplies a signal test (Sig-test) request or a voice data test (VF-test) request to the central office terminal 100, the test instruction for either the Sig-test request or the VF-test request is transmitted to the channel boards 104(n) and 240(n) in the same manner as information in the set up sequence described above. The channel boards 104(n) and 240(n) carries out the Sig-test operation or the SV-test operation in accordance with the test instruction.

That is, in the central office terminal 100, the signal testing circuit (Sig-test circuit) 63 or the data testing circuit (VF-test circuit) 64 is activated by the internal controller 61 of the control board 106. The signal information (Sig-information) or the data information (FV-information) is supplied to the channel board 104(n) via the composition circuit 65, the selecting circuit 67 and the channel test signal wires 71, and is supplied to the multiplexer portion 51. The Sig-information or the VF-information is transmitted to the remote terminal 200 using the time slot TS24 of the channel CH24. In the remote station 200, the sig-information or the VF-information is supplied to the control board 260 via the demultiplexer portion 52 and the channel board unit 240. When the Sig-information or the VF-information is received by the control board 260, the Sig-information or the VF-information is supplied to the Sig-test circuit 63 or the VF-test circuit 64. In the Sig-test circuit 63 or the VF-test circuit 64, the level of the test signal is detect, and it is determined, based on the detected level, whether or not the test signal is normal. The detection result and/or the determination result are supplied as the testing result to the internal controller 61. The internal controller 61 supplies to the multiplexer portion 51 of the MUX/DMUX board unit 250 via the control communication wire 73. The testing result is transmitted from the multiplexer portion 51 to the central office terminal 100 via the communication line A using the time slot TS24 of the channel CH24. In the central office terminal 100, the testing result is supplied to the internal controller 61 via the demultiplexer portion 52 and the control communication line 73. The internal controller 61 informs of the control terminal unit 103 the testing result.

When the test instruction is supplied from the control board 106 in the central office terminal 100 to the control board 260 in the remote terminal 200, the test information may be transmitted from the control board 260 to the control board 106, as an alternative to the above procedure. In this case, the Sig-test and/or the VF-test are performed by the control board 106 in the central office terminal 100.

In the Sig-test, it is tested, for example, whether or not the calling and call-in operations are normal. In the VF-test, it is tested, for example, whether or not the voice signal has the predetermined level.

Figure 10C:
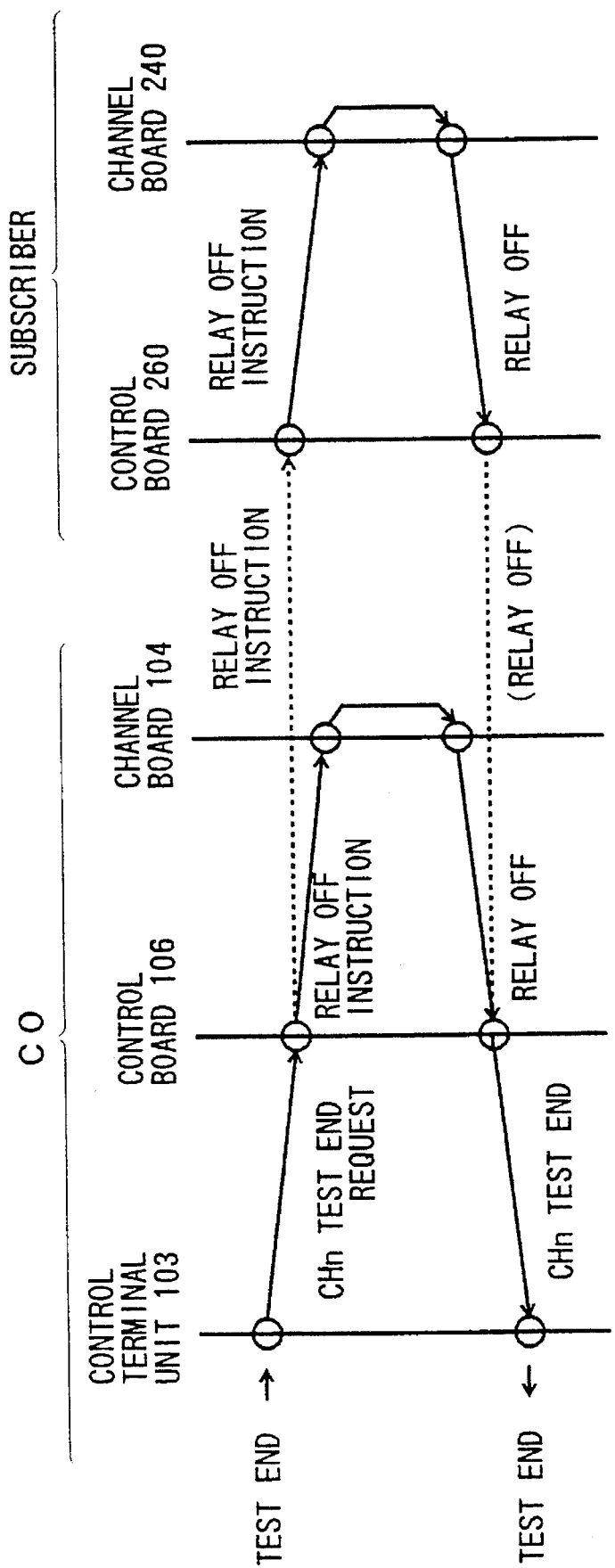

The test mode operation is ended in accordance with the procedure as shown in FIG. 10C.

Referring to FIG. 10C, the control terminal unit 103 supplies a test ending instruction to the control board 106. The control board 106 sends an OFF instruction by which the test mode relay 141 is to be turned off to the channel board 104(n). The OFF instruction is further supplied to the multiplexer portion 51 and is transmitted to the romote terminal 200 via the communication line A using the time slot TS24 of the channel CH24. In the remote terminal 200, the OFF instruction is supplied to the channel board 240(n) via the demultiplexer 52. In each of the channel boards 104(n) and 240(n), the test mode relay 141 is turned off in accordance with the OFF instruction. The response signal indicating that the test mode relay 141 has been turned off is supplied to the control boards 106 and 260. When the control board 106 in the central office terminal 100 receives the response signal from the channel board 104(n) and 240(n), the control board 106 informs the control terminal unit 103 that the test mode operation has been ended.

If an external testing unit is connected to the jack 66, testing information from the external testing unit is supplied to the channel board unit 104 via the jack 66, the selecting circuit 67 and the channel test signal wires 71. In this case, other tests of the channel board units 104 and 240 can be performed.

The present invention is not limited to the aforementioned embodiments, and variations and modifications may be made without departing from the scope of the claimed invention.

What is claimed is:

1. A subscriber digital transmission system in which a first terminal and second terminal are coupled to each other by a digital line, said second terminal accommodating a plurality of subscribers, said system comprising:

communication means within the first and second terminals for transmitting a multiple signal via the digital line between said first terminal and said second terminal, information being multiplexed in a plurality of time slots in the multiple signal;

multiplexing means, coupled to said communication means, for multiplexing first information for the subscribers and second information other than the first information of the subscribers in accordance with a time-division multiprocessing, the second information being assigned to a predetermined time slot of the multiple signal to be transmitted by said communication means and, first information generating means, provided in said first terminal, for generating bit status information indicating a state of bits in the multiplexed signal to be transmitted to said second terminal, said bit status information being transmitted as the second information to said second terminal by said multiplexing means and said communication means; and second information generating means, provided in said second terminal, for generating performance information using said bit status information from said first information generating means, said performance information indicating a state of said system, said performance information being transmitted as the second information to said first terminal by said multiplexing means and said communication means, so that the state of said system is supervised based on said performance information in said first terminal, wherein said first information generating means comprises, first calculating means for performing a calculation using bits in the multiplexed signal in accordance with a predetermined algorithm and for outputting a calculation result as the bit status information, and wherein said second information generating means comprises, second calculation means for performing a recalculation using bits of the multiplexed signal received by said second terminal in accordance with the predetermined algorithm and for outputting a recalculation result; and comparison means for comparing the recalculation result with the calculation result transmitted from said first terminal and for outputting the performance information based on a comparison result.

2. A system as claimed in claim 1, wherein said first calculation means performs a CRC-6 calculation and said second calculation means performs a CRC-6 recalculation.

3. A system as claimed in claim 1, wherein said first calculation means performs a BIP-8 calculation and said second calculation means performs a BIP-8 recalculation.

4. A system as claimed in claim 1, further comprising:

storage means, provided in said first terminal, for storing said performance information along with time information indicating a time at which said performance information is generated.

5. A system as claimed in claim 2, wherein said comparison means counts a number of error cases where the recalculation result is not equal to the calculation result, and the number of the error cases is output as the performance information from said comparison means.

6. A system as claimed in claim 3, wherein said comparison means calculates a rate at which an error case occurs, said error case being a case where the recalculation result is not equal to the calculation result, the rate being output as the performance information from said comparison result.

7. A system as claimed in claim 1, wherein the multiplexed signal is a DS1 signal having an SLC-94 frame format.

8. A system as claimed in claim 1, wherein the multiplexed signal is a DS1 signal having a superframe format (SF format).

9. A system as claimed in claim 1 further comprising:

test starting means, provided in said first terminal, for generating starting information required for starting a test mode operation in said system, said starting information being transmitted as the second information to said second terminal by said multiplexing means and said communication means;

test means, provided in said second terminal, for performing the test mode operation when said second terminal receives the starting information; and information generating means, coupled to said second terminal, for generating test result information of the test mode operation performed by said test means, the test result information being transmitted as the second information to said first terminal by said multiplexing means and said communication means, so that it is determined based on the test result information whether or not said system is operating normally.

10. A system as claimed in claim 9, wherein said test mode operation includes an operation for testing a calling signal and/or a call-in signal.

11. A system as claimed in claim 9, wherein said test mode operation includes an operation for testing voice data.

12. A system as claimed in claim 9, wherein said multiplexed signal has a superframe format (SF format).

13. A first terminal to be coupled to a remote terminal accommodating to a plurality of subscribers by a digital line in a subscriber digital transmission system, said terminal including multiplexing means for multiplexing first information for the subscribers and second information other than the first information for the subscribers in accordance with a time-division multiproccessing, the second information being assigned to a predetermined time slot, and for outputting a multiplexed signal in which information is multiplexed in a plurality of time slots; and transmission means for transmitting the multiple signal to said remote terminal via said digital line said system comprising first information generating means, provided in said first terminal, for generating bit status information indicating a state of bits in the multiplexed signal to be transmitted to said remote terminal, said bit status information being transmitted as the second information to said remote terminal by said multiplexing means and said communication means; and second information generating means, provided in said remote terminal, for generating performance information using said bit status information from said first information generating means, said performance information indicating a state of said system, said performance information being transmitted as the second information to said first terminal by said multiplexing means and said communication means, so that the state of said system is supervised based on said performance information in said first terminal wherein said first information generating means comprises first calculating means for performing a calculation using bits in the multiplexed signal in accordance with a predetermined algorithm and for outputting a calculation result as the bit status information, and wherein said second information generating means comprises:

second calculation means for performing a recalculation using bits of the multiplexed signal received by said second terminal in accordance with the predetermined algorithm and for outputting a recalculation result; and comparison means for comparing the recalculation result with the calculation result transmitted from said terminal and for outputting the performance information based on a comparison result.

14. A remote terminal accommodating a plurality of subscribers to be coupled to a central office terminal by a digital line in a subscriber digital transmission system, said remote terminal including multiplexing means for multiplexing first information for the subscribers and second information other than the first information for the subscribers in accordance with a time-division multiprocessing, the second information being assigned to a predetermined time slot, and for outputting a multiplexed signal in which information is multiplexed in a plurality of time slots;

transmission means for transmitting the multiple signal to said central office terminal via said digital line and, first information generating means, provided in said remote terminal, for generating bit status information including indicating a state of bits in the multiplexed signal to be transmitted to said central office terminal, said bit status information being transmitted as the second information to said central office terminal by said multiplexing means and said communication means; and second information generating means, provided in said central office terminal, for generating performance information using said bit status information from said first information indicating a state of said system, said performance information indicating a state of said system, said performance information being transmitted as the second information to said remote terminal by said multiplexing means and said communication means, so that the state of said system is supervised based on said performance information in said remote terminal wherein said first information generating means comprises first calculating means for performing a calculation using bits in the multiplexed signal in accordance with a predetermined algorithm and for outputting a calculation result as the bit status information, and wherein said second information generating means comprises second calculation means for performing a recalculation using bits of the multiplexed signal received by said central office terminal in accordance with the predetermined algorithm and for outputting a recalculation result; and comparison means for comparing the recalculation result with the calculation result transmitted from said remote terminal and for outputting the performance information based on a comparison result.

* * * * *

UNITED STATES PATENT AND TRADEMARK OFFICE
CERTIFICATE OF CORRECTION

PATENT NO. : 5,453,989
DATED : September 26, 1995
INVENTOR(S) : Kitayama et al.

It is certified that error appears in the above-indentified patent and that said Letters Patent is hereby corrected as shown below:

Column 1, line 47, delete "unite" and insert --units--.

Column 3, line 3, delete "role" and insert --rule--.

Column 5, line 40, delete "cage" and insert --case--.

Column 7, line 2, delete "ot" and insert --not--.

Column 9, line 60, insert --105-- after "unit".

Column 10, line 43, delete "bellow" and insert --below--.

Signed and Sealed this

Twenty-fourth Day of September, 1996

Attest:

BRUCE LEHMAN

Attesting Officer          Commissioner of Patents and Trademarks